T. SHAW.
Compound Blowers.
No. 140,597. Patented July 8, 1873.
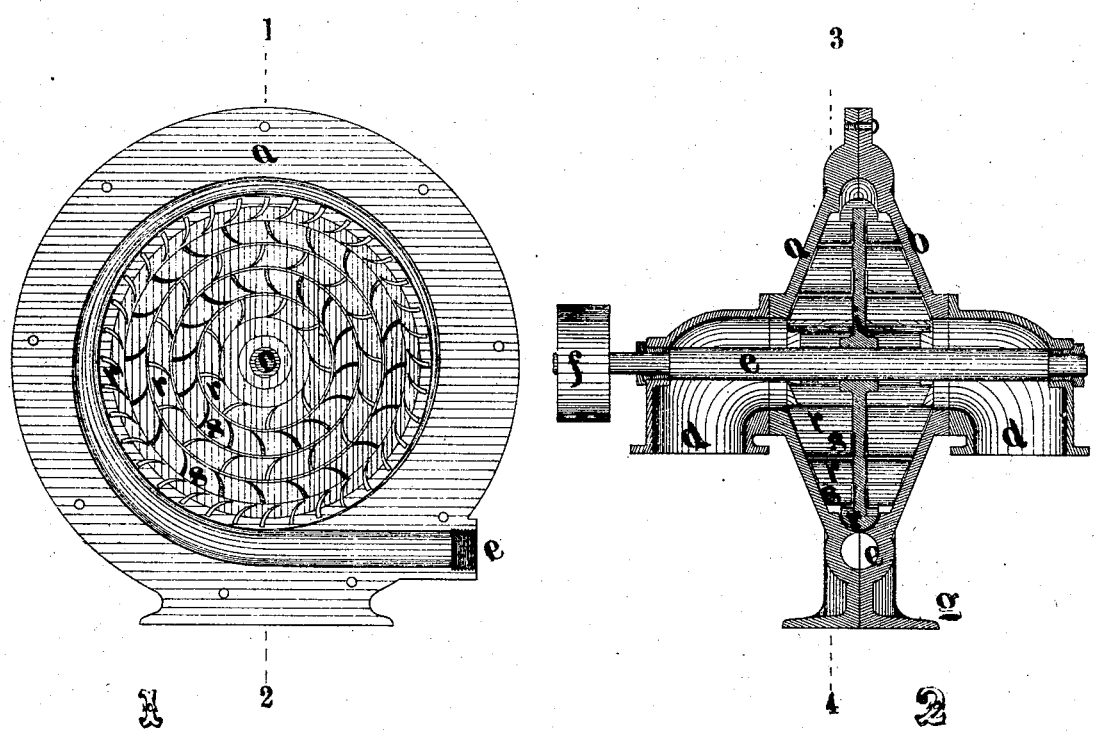

UNITED STATES PATENT OFFICE.

THOMAS SHAW, OF PHILADELPHIA, PENNSYLVANNIA.

IMPROVEMENT IN COMPOUND BLOWERS.

Specification forming part of Letters Patent No. 140,597, dated July 8, 1873; application filed May 23, 1873.

*To all whom it may concern:*

Be it known that I, THOMAS SHAW, of the city and county of Philadelphia, Pennsylvania, have invented a new and Improved Compound Blower; and I hereby declare the following to be a full, clear, and exact description of the same, reference being had to the accompanying drawing and to the letters of reference marked thereon.

My invention consists in the compounding of the rotative and stationary wings, in the manner and for the purpose as hereinafter described. The object of the invention is to increase the pressure of blowers.

In order to enable others to use and practice my invention, I will proceed to describe its construction and operation.

On reference to the accompanying drawings, which form part of this specification, Figure 1 is a vertical section across line 3 and 4 of Fig. 2; and Fig. 2 is a vertical section across line 1 and 2, Fig. 1.

Similar letters refer to similar parts, of which—

$a$ and $b$ are the concave sides, screwed together on their outer edge and terminate in base $g$, and are provided with inlet-elbows $d$. Said elbows are provided with journal-boxes for the support of shaft $c$. Disk $i$ is firmly secured to shaft $c$, and wings $r$ are secured to disk $i$, and intervening said wings $r$ are stationary wings $s$ secured to the concave sides $a$ and $b$.

The shaft $c$ and disk $i$ with its wings $r$ are rotated by means of pulley $f$ from any source of power.

The operation of compounding the pressure is in this wise: On rotating the disk $i$, with its attending wings $r$, in the direction of the outlet $e$, the first row of wings $r$ from the inlet take violent hold upon the air in the same manner as ordinary centrifugal blowers, when the air is deflected from its rotative course by the first row of stationary wings, $s$, and causes the air to approach the next succeeding row of rotative wings $r$ in a direction at right angles to the motion under all the pressure that the first operation is capable of imparting; and when the air comes in contact with the next succeeding row of wings there is as much more pressure added to the air as equals the first series of wings; and this amount of increase of pressure occurs in every series of wings however greatly they may be multiplied; and it is intended to so multiply the rows of wings until the desired pressure is obtained.

It will be evident that this method of increasing pressure can be variously applied, and that the shape of wings may be variously modified.

What I claim, and desire to secure by Letters Patent, is—

The combination of two or more alternating series of stationary and rotative wings, in the manner and for the purpose set forth.

THOMAS SHAW.

Witnesses:
WM. F. BREY,
JULIAN J. KEENAN.